United States Patent [19]

Schnaibel

[11] 3,934,940
[45] Jan. 27, 1976

[54] SAFETY INTERLOCK CIRCUIT FOR SWITCHING BRAKE ANTILOCK SYSTEMS IN A TRACTOR TRAILER VEHICLE COMBINATION IN AND OUT

[75] Inventor: Eberhard Schnaibel, Hemmingen, Germany

[73] Assignee: Robert Bosch G.m.b.H., Stuttgart, Germany

[22] Filed: Sept. 23, 1974

[21] Appl. No.: 508,326

[30] Foreign Application Priority Data
Oct. 19, 1973  Germany............................ 2352496

[52] U.S. Cl.............. 303/21 R; 180/82 R; 180/103; 303/7; 303/20; 317/9 C; 340/248 B; 340/253 B
[51] Int. Cl.²...................... B60T 8/02; B60T 13/00
[58] Field of Search............ 303/21 R, 21 A, 21 AF, 303/20, 7; 188/3 R, 112, 181 R; 180/103, 82 R; 340/52 R; 317/9 A, 9 AC, 9 C, 141 S, 36 TD; 307/116, 117, 52, 93, 94; 324/51

[56] References Cited
UNITED STATES PATENTS

| | | | |
|---|---|---|---|
| 2,324,424 | 7/1943 | Pollack............................ | 340/248 B |
| 3,544,172 | 12/1970 | Howard et al................. | 303/21 AF |
| 3,620,577 | 11/1971 | Neisch et al...................... | 303/7 X |
| 3,822,920 | 7/1974 | Bernhardt et al............. | 303/21 R X |
| 3,843,207 | 10/1974 | Syria........................... | 303/21 AF X |

*Primary Examiner*—Trygve M. Blix
*Assistant Examiner*—Douglas C. Butler
*Attorney, Agent, or Firm*—William R. Woodward

[57] ABSTRACT

In the tractor vehicle a current measuring resistor is interposed in the line supplying current to a coupling connector terminal to which the antilock system of a trailer equipped with such a system is connected for its power supply. A resistor load is connected to this power supply line through a switch that is closed when no trailer is coupled but is held open when a trailer is coupled. The current through the current measuring resistor either flowing through the resistor load or through a normally functioning antilock system of a trailer causes operation of a threshold switch to energize the brake antilock system of the tractor vehicle. A relay controlled by a starting circuit controls the application of the supply voltage to the trailer brake antilock system which is arranged to be tripped by a malfunction of the antilock system that may occur after a brief starting period, in which case the reduction of current in the supply line also results in putting the antilock system of the tractor out of operation. Thereafter, the antilock systems cannot be put into operation again until the voltage supply to the trailer is interrupted and reapplied to restart the antilock system of the trailer.

8 Claims, 1 Drawing Figure

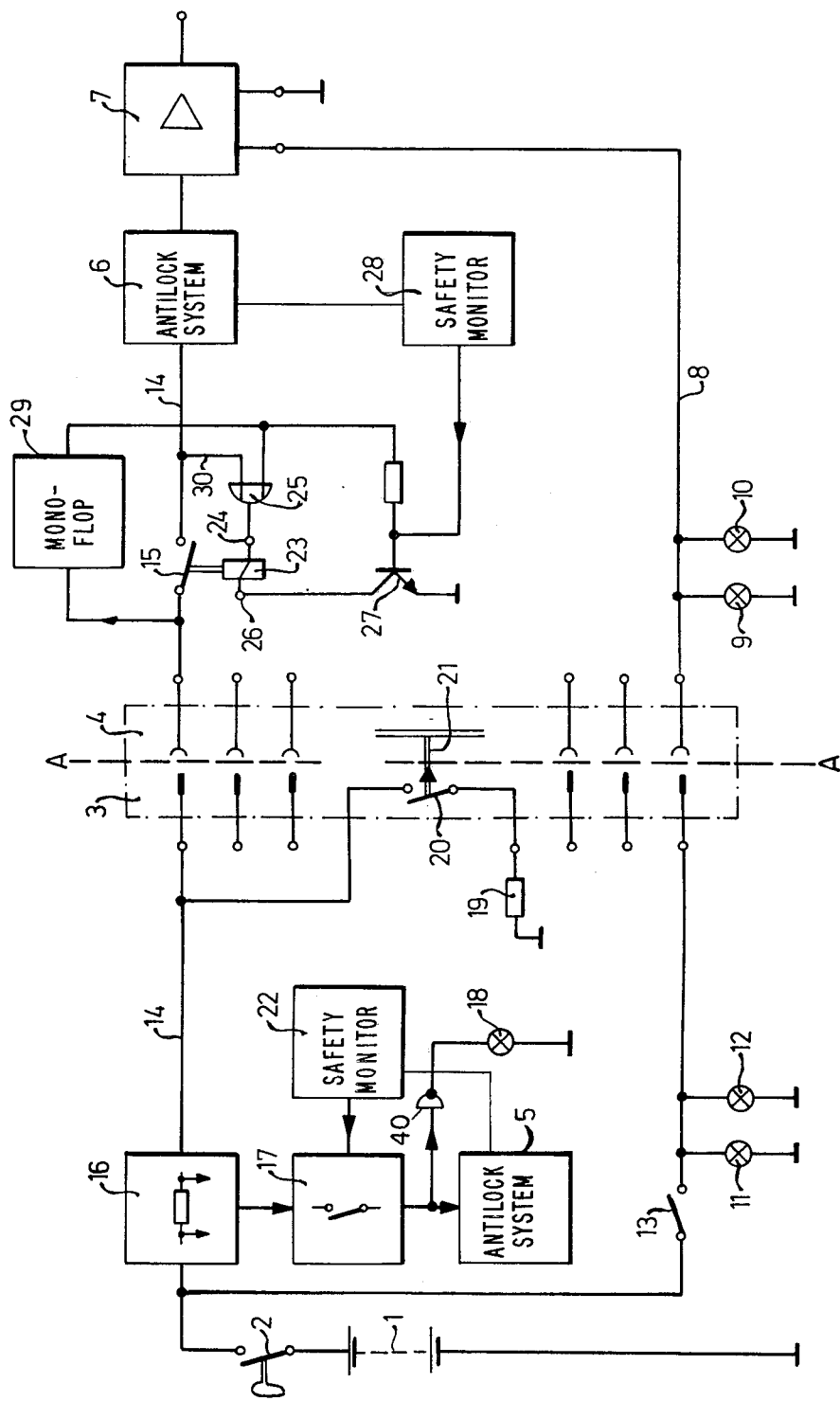

SAFETY INTERLOCK CIRCUIT FOR SWITCHING BRAKE ANTILOCK SYSTEMS IN A TRACTOR TRAILER VEHICLE COMBINATION IN AND OUT

CROSS-REFERENCE TO RELATED PATENT

U.S. Pat. No. 3,822,920 to Walter Bernardt, assigned to the assignee of the present application.

This invention relates to a protective interlocked system for switching the brake antilock systems of tractor and trailer vehicles of a tractor trailer combination into and out of operation, and particularly a system including provisions for when the tractor vehicle has a brake antilock system and the trailer vehicle does not.

At the present time, commercial vehicles are beginning to be equipped with brake antilock systems in order to reduce the risk of accident in emergency braking. A considerable lapse of time may be expected, however, until the introduction of antilock braking systems progresses to the point where such systems are generally used in utility vehicles. During this introductory period, road transport companies, for example, will frequently have to face the problem that a trailer without antilock braking will be attached to a tractor unit possessing a brake antilock system. The driver of the tractor must in such case put the antilock system out of action.

If the driver forgets to deactivate the antilock system of the tractor in such a case, a very dangerous situation can arise in case of emergency braking. The braking pressure on the wheels of the tractor unit will be controlled through an optimum braking moment value and an optimum wheel slip amount. Locking of the tractor wheels will thus be prevented. If, at the same time, the wheels of the trailer are sharply braked and lock, the trailer will go into a skid because its wheels will apply to the pavement a smaller braking force and a smaller lateral guiding force than the wheels of the tractor unit.

It is, accordingly, an object of the present invention to provide a protective circuit that will force the deactivation of the brake antilock system of the tractor unit whenever a trailer having no brake antilock system is coupled to the tractor unit. It is a further object of the invention to provide such a circuit with arrangements for assuring the proper activation of the antilock system of a trailer when it is coupled to a tractor unit vehicle.

SUMMARY OF THE INVENTION

Briefly, connector means are provided on the tractor and trailer vehicles for communicating the supply voltage through a supply line to a brake antilock system of the trailer vehicle if there is one there. Current measuring means are provided in the supply line of the tractor vehicle and a threshold switch is provided to disable the antilock system of the tractor vehicle and light a warning light on its dashboard whenever the current through the supply line is at a value less than a predetermined minimum, which is the least current that an antilock system in a trailer vehicle may be expected to draw. A switch is provided in the connector means of the tractor which will place a dummy load on the aforesaid supply line whenever no trailer is attached to the tractor vehicle. The switch is so constructed that whenever a trailer is coupled to the tractor unit, the switch is caused to disconnect the dummy load.

Antilock systems are normally provided with monitoring circuits for detecting malfunctions of a character that require the antilock system to be taken out of operation for the safety of the vehicle. In the antilock system of the tractor vehicle, these monitor circuits can be arranged to operate the same threshold switch that responds to the current measuring means in the voltage supply line to the antilock system of a trailer vehicle. An automatically controlled switch is also provided in the voltage supply line in the trailer vehicle leading to the brake antilock system which can be opened by the monitor circuits of the brake antilock system in case of serious malfunction, in which case the opening of this switch will reduce the current in the current measuring means in the tractor vehicle and cause the brake antilock system of the tractor vehicle likewise to be taken out of operation.

The control switch in the trailer vehicle is arranged in a starting circuit in which a monostable flipflop causes the switch to be turned on for a predetermined starting time during which signals from the monitoring circuit will be prevented from opening the switch, because during the starting period, transients in the antilock system might open the switch and hang up the normal type of starting circuit that works with an initial operating pulse and a holding circuit for the switch. Once the system is in normal operation, it is of course desirable that the switch should stay tripped after a serious malfunction appears. In a preferred form of the invention, the starting circuit uses an electro-magnetic relay for the controlled switch, with an energizing coil having one terminal connected to chassis ground through the switching path of a switching transistor and the other terminal connected to the output of an OR-gate, one input of which is the usual holding circuit and the other of which is energized by the monostable flipflop circuit during the starting period. The control terminal of the switching transistor is connected through an input resistor to the monostable flipflop and is also connected to the monitoring circuits in a manner in which the control provided by the monostable flipflop cannot be overridden by the monitoring circuits.

The coupling between the tractor and trailer vehicles, of course, will make the usual electrical connection for lights and the like between the tractor and trailer vehicles as well as provide the features above mentioned of the connector means. In one form of the invention, the brake light energizing circuit, which is controlled by a switch in the brake pedal of the tractor vehicle, is used to power an output amplifier of the trailer's antilock system independently of the voltage supply line to the antilock system of which the current is measured for controlling the switching in or out of the antilock system of the tractor vehicle.

BRIEF DESCRIPTION OF THE DRAWING

The invention is further described by way of example with reference to the annexed drawing, the single FIGURE of which is a circuit diagram, partly in block form, of equipment according to the invention in a tractor vehicle and in a trailer vehicle.

DESCRIPTION OF THE PREFERRED EMBODIMENT

In the drawing, the portion to the left of the dashed line A—A represents equipment in a tractor vehicle and the portion to the right thereof represents equipment in a trailer vehicle. The battery 1 in the tractor vehicle, in the usual way, provides current for the electrical equipment both in the tractor vehicle and in any trailer that may be hitched to it. This operating voltage source 1 is arranged to supply current to that electrical equipment only when, as is usually provided, the ignition switch 2 is operated. A multi-contact connector 3 on the tractor vehicle and a mating multi-contact connector 4 on the trailer vehicle are provided for making all the necessary electrical connections between the electrical system of the tractor vehicle and that of the trailer vehicle.

In the example shown in the drawing, not only has the tractor vehicle a brake antilock system 5, but the trailer vehicle also has the brake antilock system 6. Such brake antilock systems are well-known and do not need to be described further here. In the present example, the brake antilock system 6 is shown working into an output amplifier 7 for operating the mechanical members of the brake antilock system (not shown). The output amplifier 7 is specifially shown in the drawing for the trailer installation in order to indicate that it is provided with current over the brake light energizing conductor 8 which is made heavier than usual because it supplies the amplifier 7 as well as the brake lights 11 and 12 of the tractor and 9 and 10 of the trailer. These brake lights and the amplifier 7 are energized only when the brake light switch 13 is closed. The current supply from the voltage source to the brake antilock system 6 is provided over a connecting conductor 14, which runs from the ignition switch 2 to a terminal in the connector 3, over to a terminal in the connector 4 of the trailer, thence to switching contacts 15, and finally to the brake antilock system 6. In the portion of the voltage supply line 14, lying between the ignition switch 2 and the connector 3 on the tractor unit, a current measuring device 16 is interposed which, for example, can be simply a resistor. The voltage drop across this resistor indicates whether there is connected to the connector 3 of the tractor a mating connector 4 of a trailer that is equipped with a brake antilock system. The supply current for this antilock system 6 flows over the line 14. The voltage drop that appears across the resistance of the current measuring device 16 is evaluated by a threshold switch 17. If there flows through the current measuring device 16 a current having at least a predetermined strength corresponding to the minimum operating current of a brake antilock system, the threshold switch 17 will be put in a position in which the brake antilock system 5 of the tractor vehicle is switched into operation. When that is the case, a circuit likewise controlled by the switch 17 for energizing warning light 18 on the dashboard of the tractor vehicle has no current. In the drawing, the warning light 18 is shown connected to an inverter 40 which is operated in parallel with the voltage supply to the brake antilock system 5.

In another case, a trailer vehicle having no brake antilock system, or having a defective brake antilock system could be connected to the tractor vehicle, in which case its electrical equipment would again be connected over a connector 4 to the connector 3 of the tractor vehicle. It may be assumed that a defective brake antilock system would have at least part of its circuits tripped open by protective monitoring. In these two cases just mentioned, either no current or a current less than the above-mentioned predetermined value would flow through the line 14, so that the current measuring device would cause the threshold switch 17 to take a position in which brake antilock system 5 of the tractor vehicle is switched off and the warning device 18, which in the simplest case can be a lamp on the dashboard of the tractor vehicle, would be switched on.

Still another possibility is that the tractor vehicle might be driven without being connected to any trailer at all. In such a case, it would be undesirable to have no current flowing through the line 14, since it is desirable to have the antilock system 5 of the trailer vehicle in operation. Accordingly, there is switched in, in this case, a load resistor 19 that is connected between the chassis ground return of the voltage source 1 and the circuit breaker 20, which is always closed when no connector 4 of a trailer is connected to the connector 3 of the tractor vehicle. Thus, when no trailer is hitched, the resistor 19 draws enough current through the current measuring device 16 and the line 14 to cause the threshold switch 17 to switch in the antilock system 5. When a trailer is connected, a mechanical feature 21 of the connector 4 of the trailer holds open the circuit breaker 20, but if the trailer has an antilock system 6, its supply current flowing through the device 16 causes the switch 17 to put the antilock system 5 in operation. It is common for antilock systems to be provided with safety monitoring circuits for disabling the antilock system in case of a malfunction serious enough to require the system to be deactivated. FIG. 1 shows that such safety monitoring circuits, represented by the block 22, can be arranged to perform the necessary deactivation of the antilock system by acting on the threshold switch 17.

The switch contacts 15 previously mentioned, which are interposed in the line 14 between the trailer connector 4 and the antilock system 6, are controlled by an operating winding 23 in the usual manner of a relay. The winding 23 is connected at one of its terminals 24 through the output of an OR-gate 25 which has an input connection 30 to the portion of the line 14 between the contact 15 and the antilock system 6. The other terminal 26 of the winding 23 is connected to the common return to the battery, here the chassis of the trailer, which is of course connected to the chassis of the tractor when they are coupled, this connection to chassis ground being made through the switching path of a switching transistor 27 which serves as an emergency switch-off device for tripping the switch 15 on a signal from the safety monitoring circuits 28 that monitor the operation of the brake antilock system 6. When a serious malfunction is detected by the monitoring circuits 28, the switching transistor 27 is blocked through the connection to its base, cutting off the current in the winding 23, which releases the contacts 15 to break and interrupt the supply of current to antilock system 6. When this happens the current will also stop in the current measuring device 16 in the tractor vehicle and the antilock system 5 of the tractor vehicle will likewise be switched off.

The switching on of the contacts 15 and hence of the brake antilock system 6 is carried out by means of a monostable flipflop circuit 29 that has a trigger input connected to the portion of the line 14 that runs from the trailer connector 4 to the contact 15. When the trailer connector 4 is connected up with the tractor connector 3 and then the ignition switch 2 is closed, the sudden voltage rise on the line 14 switches the monostable flipflop circuit 29 into its unstable condition, which causes a positive signal to appear at its output. This positive signal reaches the winding 23 through the OR-gate 25 and the terminal 24 and also assures that the switching transistor 27 is conducting by applying a signal to its base. Operating current then flows through the winding 23 and closes the contacts 15, energizing the brake antilock system 6 of the trailer. The duration of the unstable switching condition of the monostable flipflop circuit 29 is made long enought to outlast all the starting transients of the antilock system 6, so that these starting transients will all die out before the monostable flipflop circuit 29 loses control the contacts 15. Even through these transients may cause the safety monitor 28 to provide a pulse that would otherwise break the current of the winding 23, the safety monitor 28 is unable to override control of the monostable flipflop circuit 29 exerted on the switching transistor 27. At the end of the duration of the unstable state of the monostable flipflop circuit 29, the winding 23 is held energized by the connection 30 from the line 14 to the OR-gate 25. The holding circuit provided by the conductor 30 assures that the operating winding 23 will receive current through the closed contacts 15 up to the time that all the electric circuits of the trailer are switched off or the time when a malfunction is detected in the antilock system 6 of the trailer resulting in blocking the switching transistor 27 by the safety monitoring system 28, whichever occurs first. A blocking of the switching transistor 27 interrupts the current of the operating winding 23, opening the contact 15 and tripping the holding circuit 30. The antilock system 6 is deenergized and the deactivation of the antilock system 5 in the tractor vehicle also occurs as previously described. The antilock system 6 cannot be reenergized by the monostable flipflop circuit 29 unless the supply voltage is taken off the line 14 and then reapplied.

Although the invention has been described with reference to a particular example, it will be understood that variations and modifications are possible within the inventive concept.

I claim:

1. A safety interlock circuit for the brake antilock systems of tractor-trailer vehicle combinations in which at least the tractor vehicle is provided with a brake antilock system, said circuit comprising:
   connecting means (3) on the tractor vehicle for connecting a voltage supply line (14) from a voltage source (1) for supplying electric power to a brake antilock system of a trailer vehicle through a mating connector on said trailer vehicle;
   current measuring means (16) comprising a resistor interposed in said voltage supply line (14) between said voltage source (1) and said connection means (3);
   means comprising a threshold switch means (17) responsive to the voltage across said resistor for disabling a brake antilock system (5) in said tractor vehicle when the current in said current measuring means is below a predetermined value, and
   warning means (18) connected to said disabling means for indicating when the brake antilock system (5) of said tractor vehicle is thereby disabled, said threshold switch means being connected so as to disable said brake antilock system (5) of said tractor vehicle and to enable said warning means (18) in one position and to disable said warning means and to enable said brake antilock system of said tractor vehicle in the other position of said threshold switch.

2. A safety interlock circuit for the brake antilock systems of tractor-trailer vehicle combinations in which at least the tractor vehicle is provided with a brake antilock system, said circuit comprising:
   connection means (3) on the tractor vehicle for connecting a voltage supply line (14) from a voltage source (1) for supplying electric power to a brake antilock system of a trailer vehicle through a mating connector on said trailer vehicle, said connection means also including electrical connection between conducting chassis structures constituting a chassis return line for said voltage source, said connection means also including circuit interruptor means (20) interposed between said voltage supply line (14) and load resistance means (19) connected between said interruptor means and the chassis return line to said voltage source, said interruptor means (20) being so constituted as to interrupt energization of said load resistance means when said connection means (3) is connected to mating connection means of a trailer vehicle;
   current measuring means (16) interposed in said voltage supply line (14) between said voltage source (1) and said connection means (3), and
   means responsive to said current measuring means (16) for disabling a brake antilock system (5) in said tractor vehicle when the current in said current measuring means is below a predetermined value.

3. A safety interlock circuit as defined in claim 2 comprising also:
   second connection means (4) on a trailer vehicle equipped with a brake antilock system (6) and of a form to mate with said connection means (3) of said tractor vehicle; said second connection means (4) for operating said interruption means (20), and
   switching means (23, 15) in circuit with said second connection means and said trailer vehicle antilock system for controllably switching said voltage supply line to power said antilock system of said trailer vehicle, said switching means having a control circuit arranged to be switchable to close and switching path through a starting circuit in response to connection of said voltage supply line to a terminal of said connecting means.

4. A safety interlock circuit as defined in claim 3 in which said starting circuit (29) comprises a monostable flipflop circuit arranged to be put into its unstable condition when said supply voltage appears at said terminal of said second connecting means (6) and is connected so that while its unstable state endures an actuating current is caused to flow through a control path (23) of said switching means (15), which actuating current is energized by said supply voltage at said terminal.

5. A safety interlock circuit as defined in claim 4 in which said starting circuit includes an OR-gate (25) whereby said control path may continue to be energized through said switching path and said OR-gate after an energizing voltage has ceased to be supplied by said starting circuit with the termination of the unstable condition of said monostable flipflop circuit (29).

6. A safety interlock circuit as defined in claim 5 in which said control path of said switching means (15) includes the switching path of a switching transistor (27) and is arranged to be completed to the chassis return to the voltage source through said switching path of said switching transistor, and in which apparatus the brake antilock system (6) of said trailer vehicle is provided with safety interlock means (28) for determining abnormal behavior of said brake antilock system and acting on said control path of said switching transistor (26) to block the switching path of said switching transistor in response to detection of such abnormal behavior.

7. A safety interlock circuit as defined in claim 6 in which said monostable flipflop circuit (29) is connected to the control path of said switching transistor so as to prevent turning off the switching path of said switching transistor by said safety interlock means (28) for the duration of the unstable state of said monostable flipflop circuit.

8. A safety interlock circuit as defined in claim 7 in which the antilock system (6) of the trailer vehicle comprises a final amplifier stage at least in part separately energized over a brake light current supply line (8) passing through respective contacts of said connection means (3) on said tractor vehicle and of said second connection means (4) on said trailer vehicle and also passing through the brake light switch (13) of said tractor vehicle.

* * * * *